Figure 1:
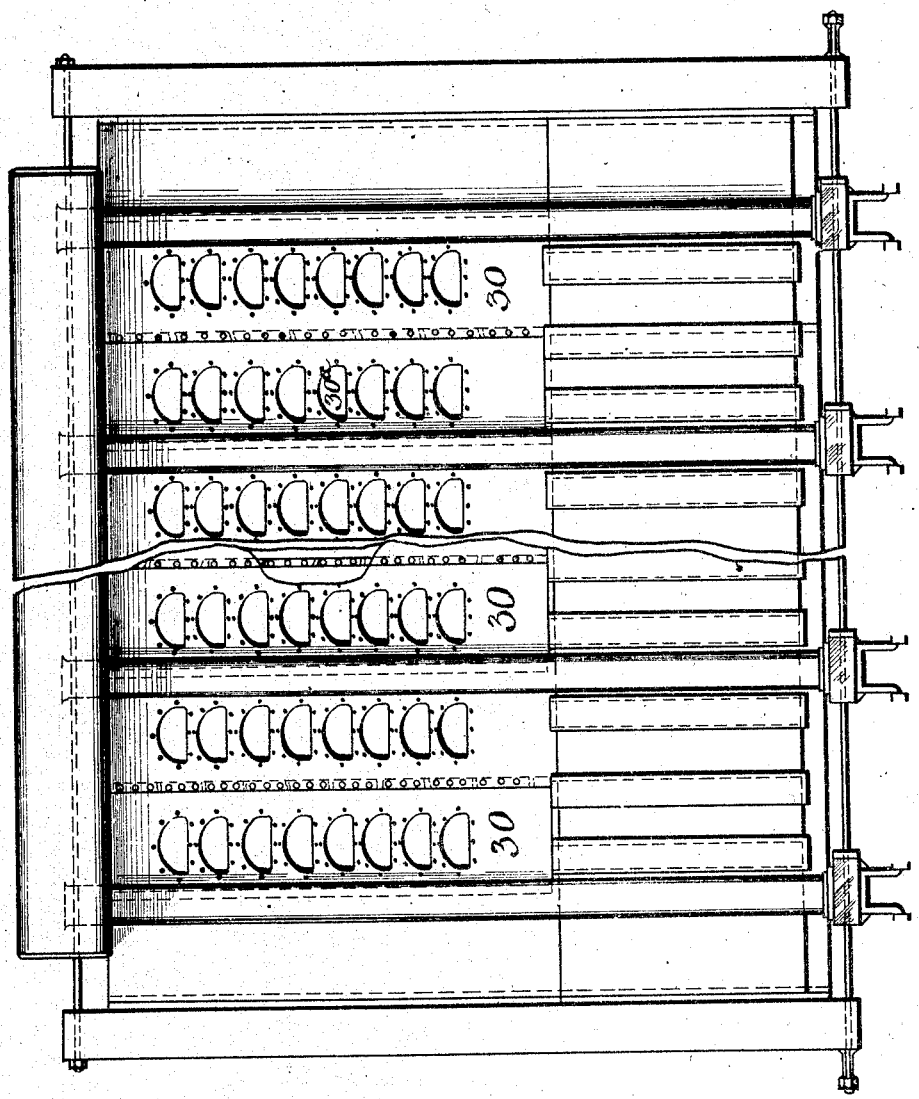

H. A. CARPENTER.
METHOD OF CONSTRUCTING AND HEATING RETORT STRUCTURES.
APPLICATION FILED JUNE 18, 1915.

1,174,390.

Patented Mar. 7, 1916.
7 SHEETS—SHEET 1.

WITNESSES
Lois Weneman
Horace E Seitz

INVENTOR
Henry A. Carpenter
by W. G. Doolittle
Attorney

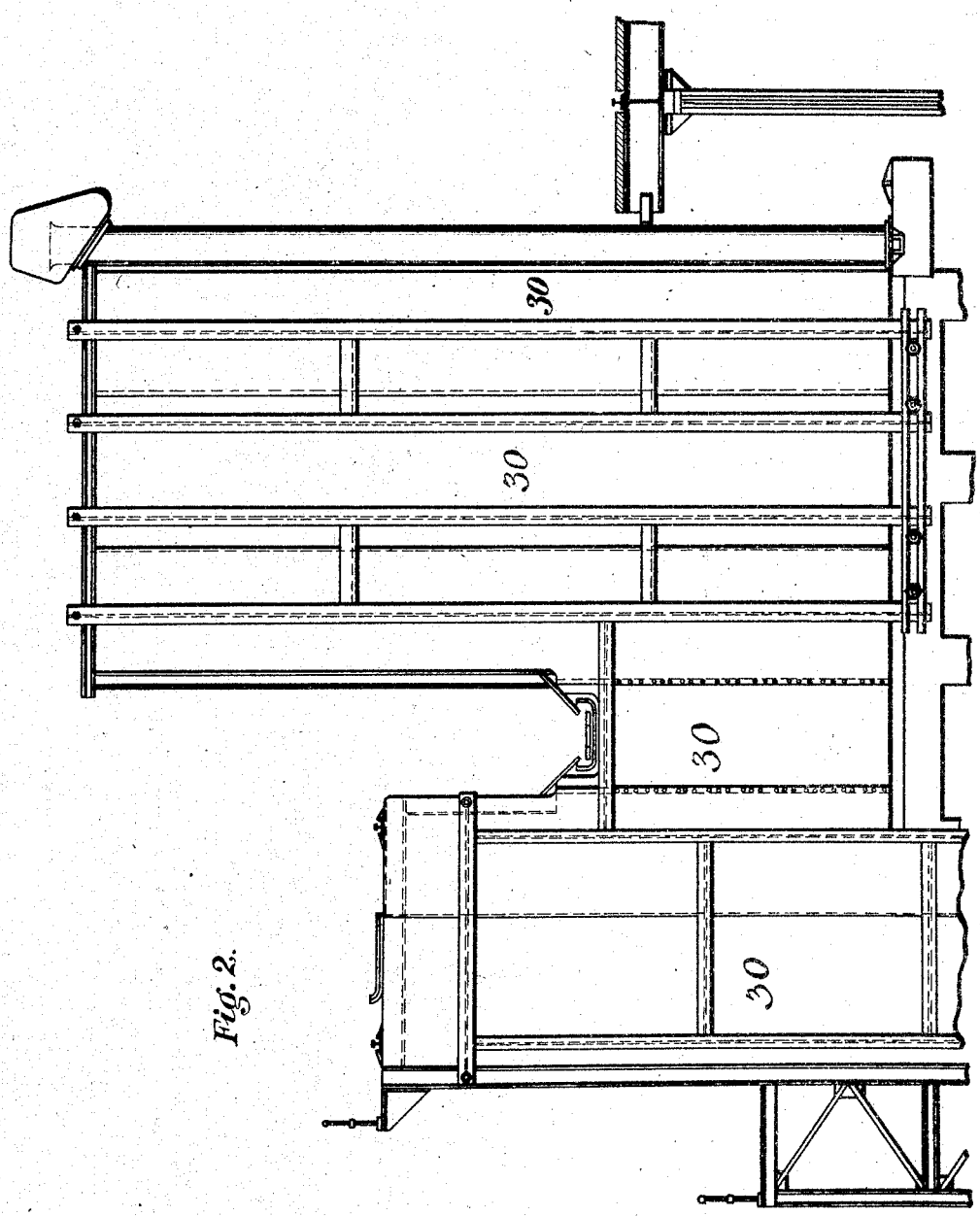

H. A. CARPENTER.
METHOD OF CONSTRUCTING AND HEATING RETORT STRUCTURES.
APPLICATION FILED JUNE 18, 1915.
1,174,390.
Patented Mar. 7, 1916.
7 SHEETS—SHEET 3.
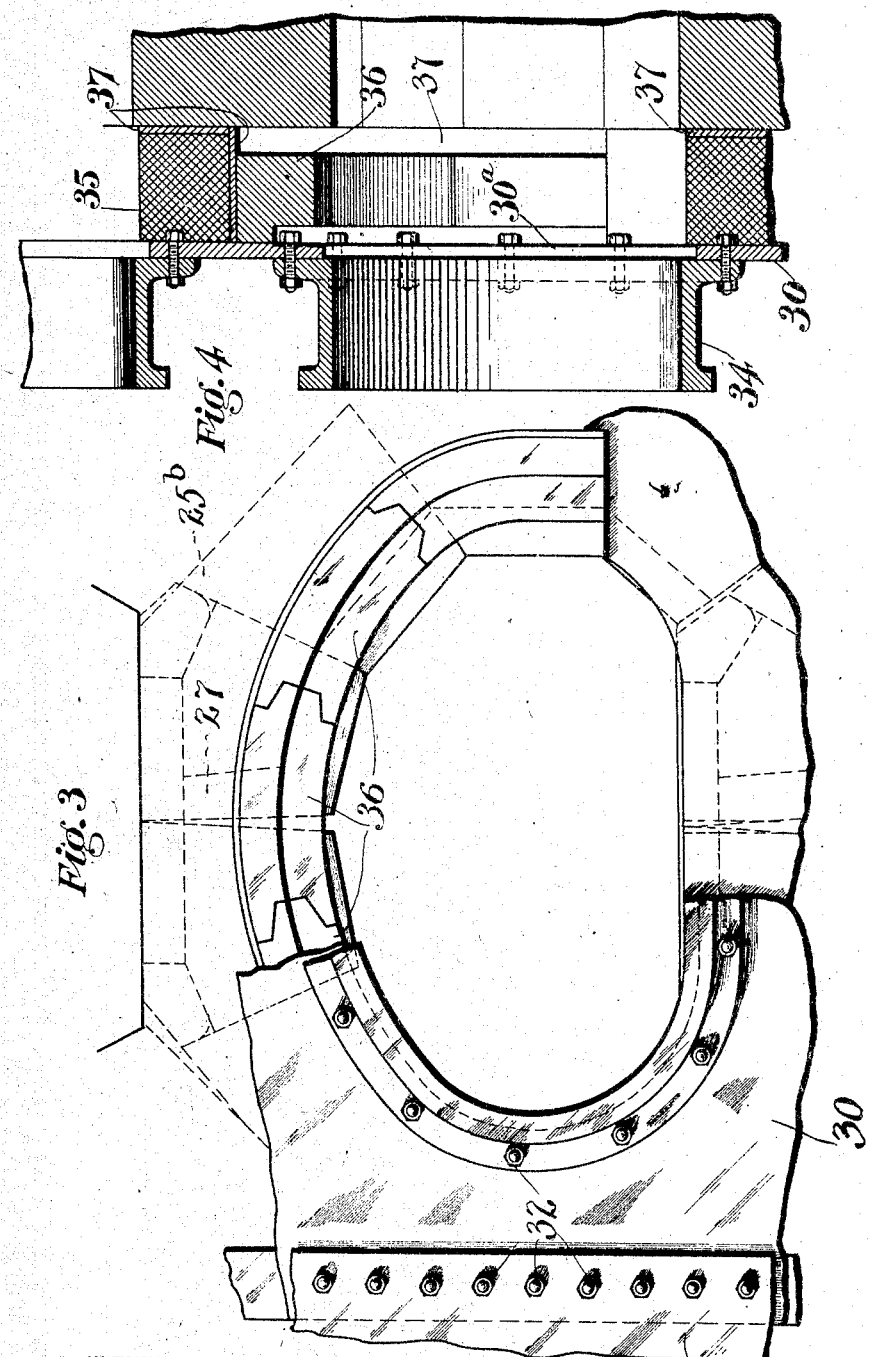

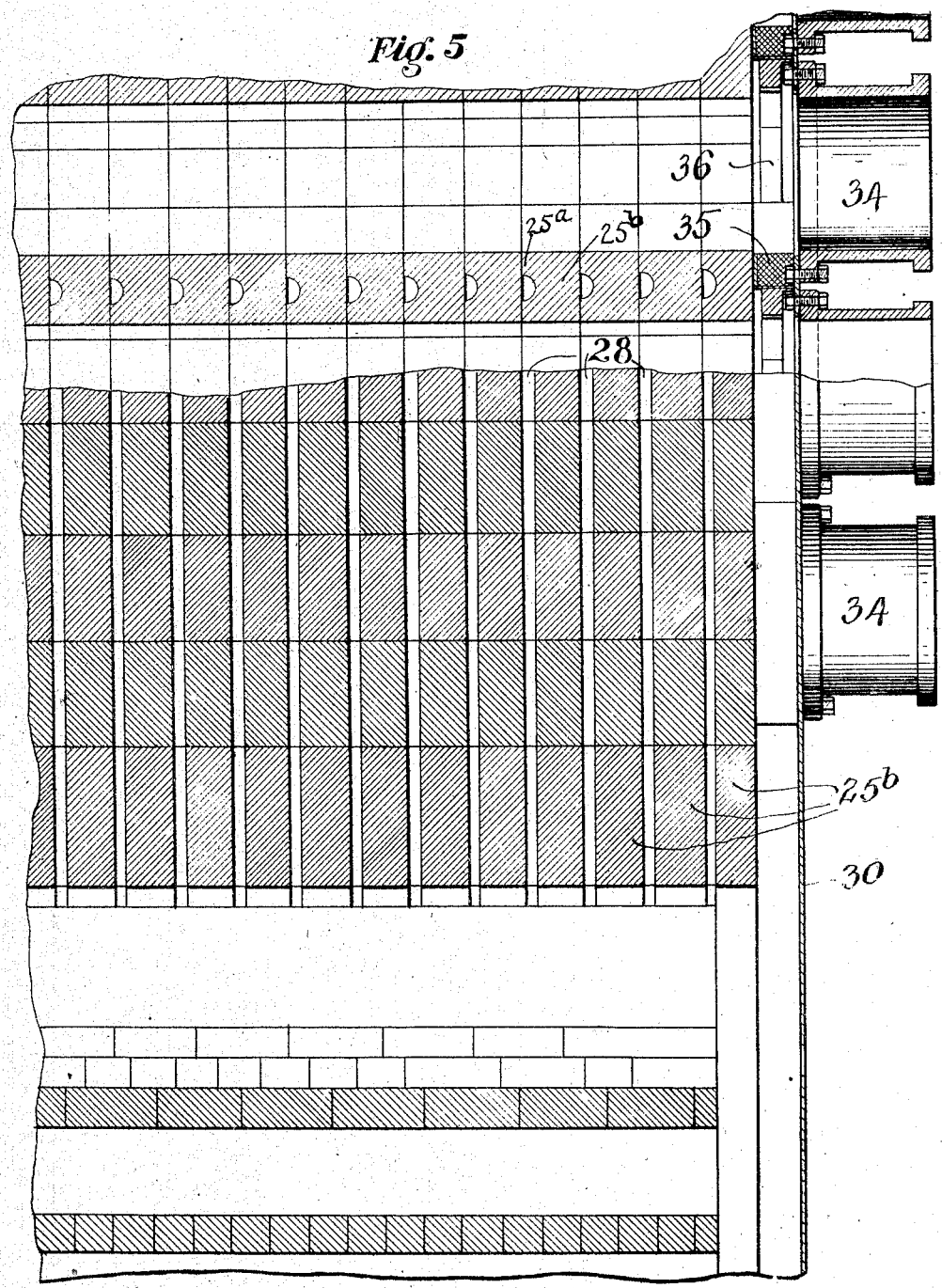

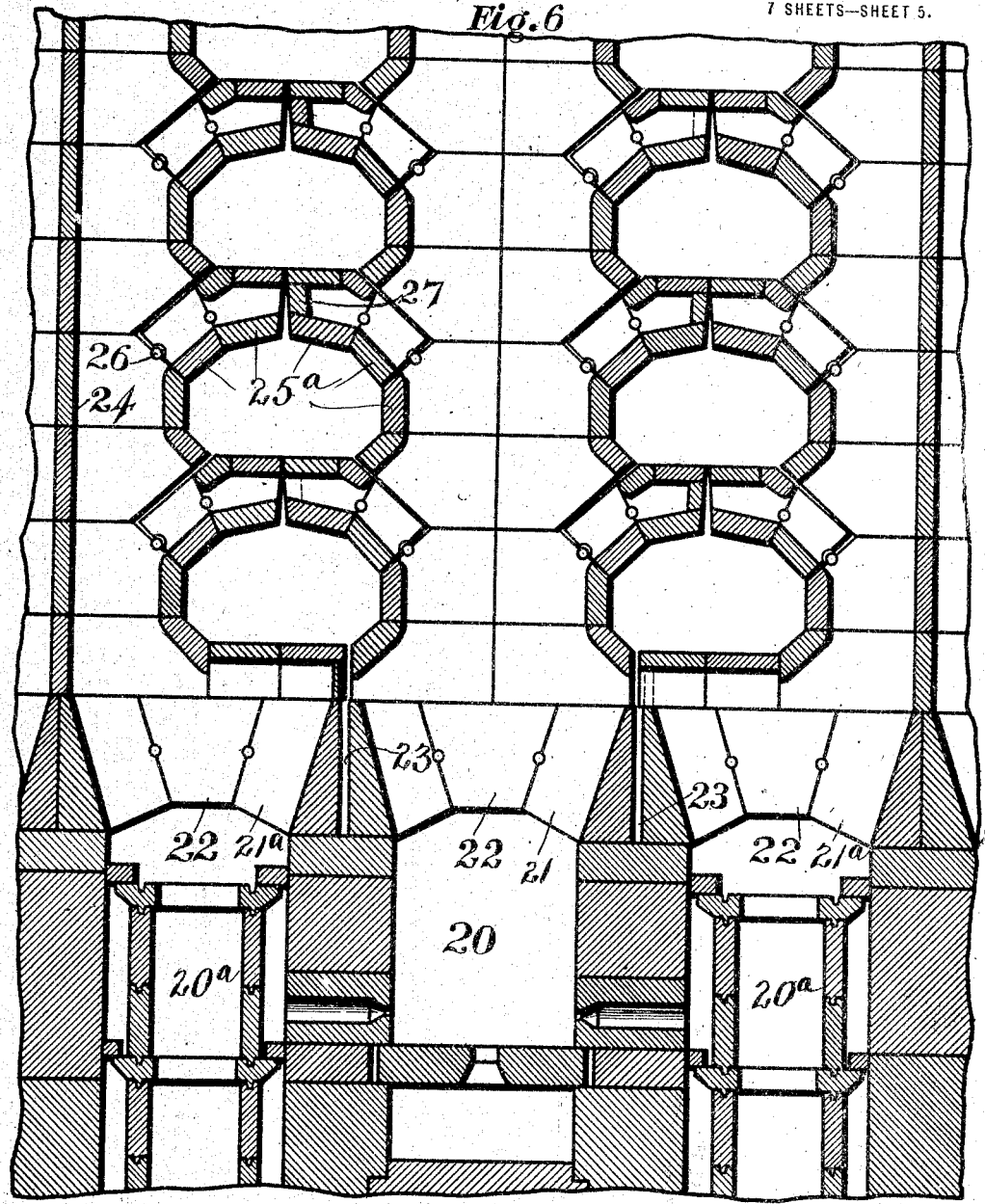

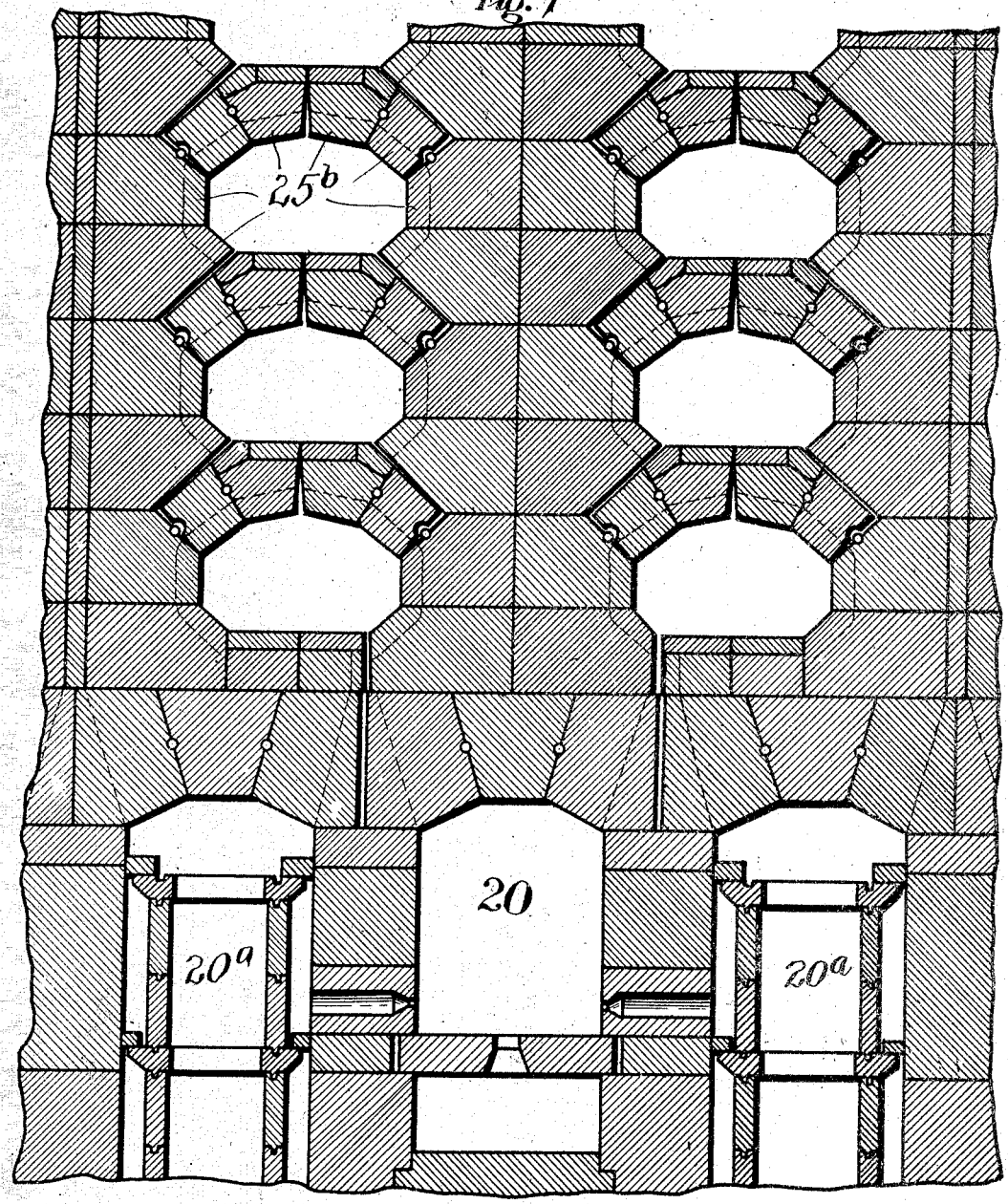

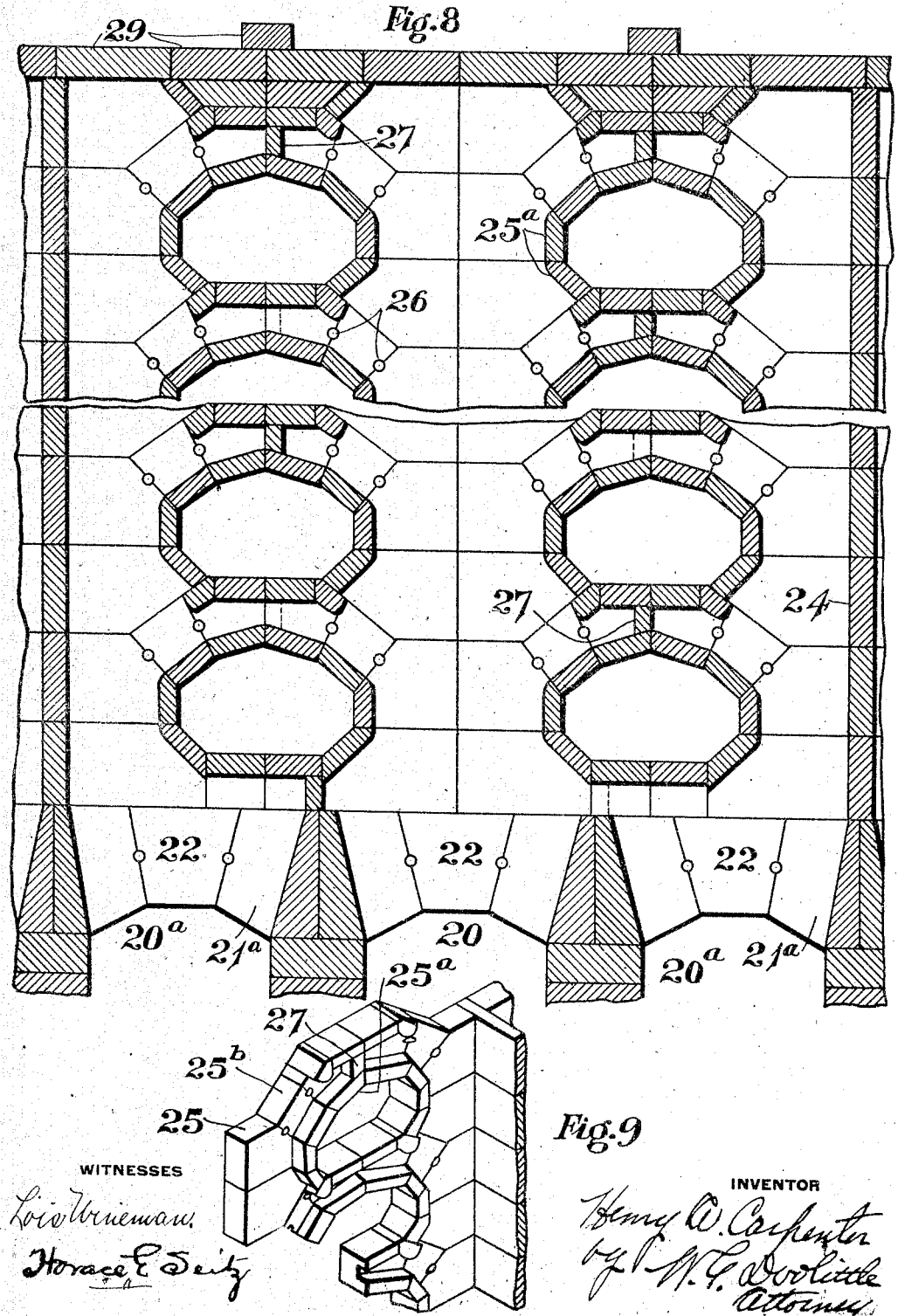

UNITED STATES PATENT OFFICE.

HENRY A. CARPENTER, OF SEWICKLEY, PENNSYLVANIA, ASSIGNOR TO RITER-CONLEY MANUFACTURING COMPANY, OF PITTSBURGH, PENNSYLVANIA, A CORPORATION OF NEW JERSEY.

METHOD OF CONSTRUCTING AND HEATING RETORT STRUCTURES.

1,174,390.  Specification of Letters Patent.  Patented Mar. 7, 1916.

Application filed June 18, 1915. Serial No. 34,922.

*To all whom it may concern:*

Be it known that I, HENRY A. CARPENTER, residing at Sewickley, in the county of Allegheny and State of Pennsylvania, have invented certain new and useful Improvements in Methods of Constructing and Heating Retort Structures, of which the following is a specification.

This invention relates to a method of constructing and heating retort structures for generating gas from coal.

Heretofore, coal gas generating apparatus has been constructed of a variety of materials and designs which have produced various results. Of recent years, refractory material of varying proportions of alumina and silica has been employed exclusively for such structures.

In general, retorts and the walls supporting them have been formed separately, the retorts themselves being formed either in one piece or of tongued and grooved blocks. The walls supporting the retorts have been of various widths, the practice generally being to arrange these walls at convenient spaces of from twelve to eighteen inches intervening, each wall having a thickness of approximately six to nine inches. In early and recent practice, such retorts and supporting walls were constructed of refractory materials predominating in alumina, and as improvement in heating such retorts tended toward high temperatures, there was a general and decided tendency for such alumina material to soften and gradually settle out of shape under such continued high heats. Then, too, in order to secure greater capacity on a given ground area, and greater efficiency in heating such retort structures, a tendency developed to construct more retorts in a vertical row than was customary in the earlier art, thus increasing the load carried by the supporting walls and the bottom retorts of such structures. The combined action of the softening of the alumina material by the high heats and the increased load of the greater number of retorts in a vertical row resulted generally in distortion of structures and consequent shortening of life, loss of efficiency, etc. In order to remedy these difficulties and to produce retort structures which would retain their shape and alinement for a reasonable period, so that it was possible to charge and discharge them by machinery requiring accuracy in alinement, I substituted several years since, for the refractory material predominating in alumina, a refractory material of nearly pure silica. This latter material, under heat, expands to such a great extent that it was entirely impracticable to build the retort structures thereof as those of alumina had previously been constructed—that is, without reference to expansion, and in order to compensate for the expansion in the retort structures of this new silica material, I constructed them of comparatively small blocks, the retorts themselves of a considerable number of pieces in circumference, where they had generally been made of one piece of alumina material, and inserted pieces of pasteboard between the joints of each of these small blocks, of such thickness as to compensate for the difference in dimension of these silica pieces when cold and when heated to working temperature, and counting on the gradual burning out of these pasteboard fillers as the structure was heated to working temperature. The top and sides of the structure formed over these retorts—that is, the portion exposed to the atmosphere, or the outside of the structure not exposed to the high heat, was constructed of refractory material predominating in alumina, which enabled me to construct these parts in the usual manner, with fire clay joints, so as to produce a reasonable tight structure against leakage to or from the atmosphere, or at least as tight in this respect as had been the general practice in the old style retort structures of the alumina type which had failed by softening and distortion of the structure under the continuous high heats and loads.

The new development of silica retorts and settings outlined in the foregoing was fairly successful so far as alinement and sustainment of load under continuous high heats was concerned, and this general method of construction has since been largely adopted for the purpose, but the necessary method of constructing the retorts with pasteboard joints, to compensate for expansion, produced a leaky retort under some conditions of operation. Further, the inability of the outer walls to withstand any material variation from atmospheric pressure without considerable leakage, as well as the difficulty in attaching the necessary mouth pieces for closing the ends of the retorts to the outer alumina walls, establishing proper alinement and action between these outer alumina walls and the inside silica structures and the desirability to still greater accuracy in alinement of the various retorts, necessitated a different construction. All of these problems were aggravated to a great extent as the number of retorts permissible under the employment of the silica material in a vertical row increased.

As a result of experiments, I have found it possible to construct refractory mass structures entirely of silica material, these structures including the retorts themselves, compensate for the expansion effects on the mass, and at the same time, employ a metal casing for the mass structure which will enable me to vary the internal working pressure of the retort structure as much, either way, from atmospheric pressure as is desirable without serious leakage. Such construction is possible by reason of the ability to compensate positively for expansion of the refractory mass, as well as that of the metal casing.

In practice, the apparatus is assembled in non-carbonizing or non-working form, it being brought into working condition only after it has been sufficiently heated to provide working temperatures. The apparatus, and particularly the inclosed refractory mass, is also assembled with a view of taking care of the expansion thereof by localizing the effects of the expansion. This method of construction constitutes an important feature of this invention.

Another characteristic and important feature of the present invention is the method of heating. The effects of expansion being known, the construction may be predetermined with accuracy; and should the temperature be let down, the contracting effects will not materially damage the construction and it may again be raised to working temperature, at which time the proper operating conditions will be restored.

In prior constructions of this class, heating of the retorts was primarily effected by passing the products of combustion through relatively wide spaces located between the setting walls, into direct contact with the retort walls. In the present invention I employ relatively narrow channels through which the products of combustion are passed, thereby considerably reducing the amount of direct contact of the products of combustion and retort walls, supplying the heat thereto mainly by conduction from the setting walls. The setting walls in the present construction are utilized as heat reservoirs, the heat from the products of combustion being stored up therein and transferred therefrom to the retort walls by conduction.

In the constructions of the prior art, it was necessary to maintain the products of combustion, to produce the desired working temperatures within the retorts, at a considerably higher temperature than it is under the present invention.

Another advantage of the present invention over the prior art structures and operations is the ability to reduce the drop in temperature within the retorts immediately after a fresh charge of coal is introduced thereto, this being accomplished by the presence of the heat reservoirs immediately surrounding the retorts.

Figure 10:
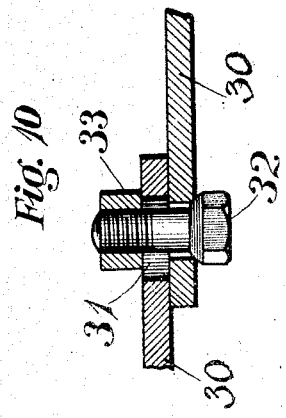

In the accompanying drawings, Figure 1 is a front elevation of a gas generating apparatus, said view showing parts of the structure broken away; Fig. 2 is an end view of the same. Fig. 3 is a detail view, partly in front elevation and partly in section, of the structure at the charging end of a retort. Fig. 4 is a sectional view of parts shown in Fig. 3. Fig. 5 is an enlarged sectional view taken vertically on different planes of a portion of the structure, the section being taken generally in the direction of length of the retorts, a portion of the view showing a section through one of the retorts, another portion of the view showing the sectional structure between vertical rows of the retorts. Fig. 6 is a vertical section taken through one of the channels for the heating gases shown in Fig. 5, the structure being shown in its assembled condition. Fig. 7 is a sectional view taken on a plane parallel to that of Fig. 6, the section extending through the walls which divide adjacent channels. Fig. 8 is a sectional view taken on the plane of Fig. 6 but showing the parts in the positions assumed when the retorts have been brought to working temperatures. Fig. 9 is a detail perspective view showing the general arrangement of the blocks of which the refractory mass is composed. Fig. 10 is a detail sectional view showing a preferred manner of connecting adjacent casing plates together.

In the present invention the manner of providing the heat for the retorts over prior art structures is radically different. Instead of supplying the heat mainly by direct contact of products and retort walls, the heat is provided mainly by conduction, the heating by direct contact being incidental. In practice, as contemplated by the present invention, this heating by conduction is effected by providing an integral relation between the retort walls and the setting walls, thereby enabling the heat stored in the setting walls to readily pass therefrom into the retort walls.

The setting walls, when arranged in the manner described, provide storage reservoirs for heat. It is known that a unit volume of the refractory materials heated to a temperature of approximately 2000° F. contains approximately six thousand times as much heat as a similar unit volume of products of combustion from the combustion chamber at the same temperature. It has been found that by thus storing the heat in the heat reservoirs and utilizing it for heating the retort walls as described, the retorts may be maintained at the desired temperatures with the employment of products of combustion at a considerably lower temperature than is possible where, as under the prior methods, the heating of the retorts is accomplished more by direct contact of the products of combustion on the retort walls, as distinguished from heating by conduction. This method of storing the heat in the manner described around the retorts and transferring it to the retort walls by conduction, as compared with the prior methods of heating, also materially reduces the drop in temperature within a retort due to the introduction of a fresh charge thereto.

The method of heating retorts referred to above is not specifically claimed herein as the same forms the subject matter of a divisional application, filed December 9, 1915, Serial No. 65,902.

The refractory mass structure formed of silica blocks requires that careful provision be made to compensate for the expansion thereof and hence it includes certain characteristic features. For instance, I provide for the effects of expansion in the direction of length of the apparatus (the direction at approximately right angles to the direction of length of the retorts) by arranging the mass in such form as to constitute what may be termed individuals, viz., a portion in which the expansive effect is limited to a predetermined length of the mass, without attempting to provide individual block compensation. Arranging these individuals so that the expansive action of adjacent individuals will bring the individuals into their proper positions and conditions when the apparatus has been heated to produce the proper working temperatures within the retorts. These individuals may comprise a vertical row of retorts, and their supporting walls with vertically extending spaces located between two rows as shown in my companion application, filed April 7, 1914, Serial Number 830,162. However, I prefer to arrange these spaces or their equivalents on vertical lines intersecting the retorts, an individual extending from one space to the next, a structure of this latter type being disclosed in my companion application filed September 2, 1914, Serial Number 859,785, as well as in the drawings accompanying my present application. In this arrangement, the blocks constituting the arch of the retort are assembled in loose formation, while the blocks forming the setting walls or columns between adjacent retorts are permanently positioned with respect to stack length. The blocks constituting the arch are brought into carbonizing position by bringing the structure to working temperature. Obviously, this arrangement places the retorts, when the structure is in its assembled but non-carbonizing condition, incapable of use before displacing action has been had through expansion, the expansion action bringing the retorts to carbonizing condition. Similarly, letting down of the temperature with a consequent contraction effect simply permits these blocks to resume their assembled or non-carbonizing condition; when the temperatures are restored, the expansion again restores the blocks to their working position. By thus arranging the structure into individual portions capable of independent expansion, the expansion action is substantially localized, enabling the supporting mass structure to be built on predetermined lines without liability of its being displaced lengthwise of the apparatus regardless of such length, and at the same time, enabling the use of a casing for the refractory mass.

I prefer to build up the individuals of what may be termed units, these units being substantially similar in structure and arranged successively in the direction of length of the retorts, each unit being preferably formed of appropriately shaped silica blocks. While these units may be independent of the retort walls and comprise simply the setting or transverse walls, I preferably arrange the setting and retort walls in integral relation, as more particularly disclosed in my companion application filed July 3, 1913, Serial Number 777,216, in which predetermined blocks of a unit are so flanged as to cause the blocks to form the portions of the retort walls exposed to the products of combustion. In assembling, the free edges of the flanged portions of the unit abut against the wall portion of the succeeding unit, thereby not only completing the retort when the units are assembled, but at the same time completing the channels for the products of combustion.

The retorts formed by the assembled units, prior to being heated, are of slightly less length than the length they will assume after the structure is raised to the desired working temperature. By thus compensating for the effects of expansion on the refractory mass, I am enabled to employ a metallic casing therefor and introduce between said casing and the refractory mass compressible insulating material. The casing is free of inter-engagement with the refractory mass, thereby permitting independent but relative movements due to the expansion of the two structures. In practice, the mouth pieces for the retorts are attached to the metallic casing, the particular construction and the manner of positioning the insulating material in connection therewith being shown in an application filed by me October 12, 1914, Serial Number 866,185.

Referring particularly to Figs. 5–9, these figures illustrate the general construction of the refractory mass. 20 indicates generally the portion of the structure for supplying the products of combustion to the retorts and their setting, this arrangement being built up of units arranged successively in the direction of length of the retorts, and 21 designate passages leading into the spaces between the walls of the retort settings presently referred to. The tops of the combustion chambers are formed of appropriately shaped blocks having a keystone portion 22, said top portions forming the support for the setting walls for the retorts and being supported in turn by the division walls of the combustion chambers. As shown more particularly in Figs. 6, and 7, in assembling, expansion spaces 23 are left between adjacent top portions at suitable points in the length of the stack, these spaces being closed by the expansion of the blocks in bringing the apparatus to working temperatures. As shown in these figures, the stack is divided into sections by means of division walls 24, these being arranged to include two vertical rows of retorts between adjacent division walls.

As shown in Figs. 6, 7 and 8, the blocks preferably have fixed shapes, Fig. 9 showing in perspective the general arrangement of a vertical series of such blocks, the width of the blocks indicating the width of the structure which I have referred to herein as a unit, this view showing parts of units of two individuals. As illustrated, the blocks are formed with wall portions 25 which, when arranged in vertical alinement, complete a cross wall which extends from one division wall to the adjacent division wall. Predetermined blocks 25$^b$ are also shown provided with laterally extending flanges 25$^a$. The exposed face of flange 25$^a$ is placed in abutting relation with the cross wall of the succeeding unit, the result being the formation of a space between adjacent cross walls equal to the depth of the flange 25$^a$, these spaces extend in vertical planes and form channels for the products of combustion. The inner faces of the blocks 25$^b$ and of the flanges 25$^a$ when assembled, form the interior of the walls of the retort, with the exception of the retort bottom, which is preferably separate in order to permit renewal when necessary.

As shown more particularly in Fig. 5, the widths of the flanges 25$^a$ are preferably less than the width of the wall portion of the block 25$^b$, a preferred arrangement being to provide a wall thickness of approximately four inches and a flange width of approximately two inches. In this construction, the spaces will be narrow as compared with the width of spaces in prior structures, and a major portion of the retort walls will fall within the planes of the setting walls, leaving a considerably less portion of the retort walls exposed to the products of combustion. Obviously, this particular relation between the width of walls and the spaces may be varied, as by causing the width of the spaces to more closely approach the width of the walls, such change simply affecting the amount of preponderance in heating by conduction over the heating by direct contact of the products of combustion with the retort walls.

As shown more particularly in Figs. 6 and 7, the blocks of a unit are arranged in superposed relation, an arrangement which forms a column-like structure at the opposite sides of the retort openings, the retort being completed by an arch-like arrangement of blocks which practically bridge predetermined blocks of the columns, the particular arrangement providing a structure such as shown in Fig. 8 when the apparatus is in operation with the retorts at carbonizing temperatures.

As shown in Figs. 6 and 7, the blocks when assembled do not form the true arch shown in Fig. 8, the latter being produced by the expansion action of the blocks in bringing the apparatus to working temperatures. In the assembled arrangement shown in Figs. 6 and 7, this arch has the appearance of sagging. However, the relative shapes of the blocks which form the arch are such as to prevent an actual collapse and at the same time permit of proper expansion of the blocks, the effect of which is to change the position of the blocks to properly complete the arch.

As an aid in preserving the relative arrangements, I may employ the dowel pin arrangement shown in these views, predetermined blocks being formed with opposing recesses or grooves adapted to receive pins 26, said pins tending to prevent any material relative movement between the opposing faces of a joint and in the direction of length of such faces. By the use of blocks 27 positioned within desired arch spaces, the course of the products of combustion through the mass structure can be controlled. I preferably employ blocks 29 at the top of the cross walls, these blocks closing the upper ends of the channels. As will be readily understood, this general construction provides channels free from intercommunication in the direction of length of the retorts, each channel being independent of another channel.

From the above, it will be seen that in assembling the mass structure I employ a plurality of similar units in abutting relation in the direction of length of the retorts, each unit, extending from one expansion space to the next in the direction of length of the stack. This assemblage of units I term an individual, owing to the fact that its arrangement is such that the expansion action on the assemblage is substantially limited to the blocks contained in this assemblage. In this manner, the expansion action is localized and the displacing action limited to points where such action does not affect the proper operation of or damage the assemblage.

As will be understood, the expansion in the direction of length of the retorts will, by reason of the assemblage of units in abutting relation, cause a displacing action of the units in this direction, thus automatically positioning the cross walls at the proper points. This displacing action necessarily increases the length of the mass structure in the direction of length of the retorts. Consequently, the assembly length of the units of the mass structure, in the direction of length of a retort, is made less than the actual working length, the latter being obtained by bringing the retorts to working temperature.

The casing structure which I employ in connection with the refractory mass is preferably built up of vertically extending plates having their side edges overlapping, the plates being secured together to permit of individual expansion in the direction of length of the stack.

In the drawings, the vertical metallic plates of the casing are shown at 30, those at the ends being secured together by rivets, while those at the front and rear are preferably secured together in the manner shown in Fig. 10, in which the inner plates are provided with elongated slots 31 through which pass bolts 32, the latter being secured individually to nuts 33 or collectively to bars, the outer plate having openings to receive the bolts, the relative arrangements being such that when the bolts are tightened, the joint formed will be substantially leakage proof.

In practice, the casing is of sufficient size to allow for the expansion of the inclosed refractory mass and to have heat insulating material, preferably ground kieselguhr, placed between its interior surface and the mass.

The mouth pieces for the retorts are mounted on the casing plates, this arrangement being shown more particularly in Figs. 3 and 4, in which the mouth pieces are indicated at 34, being bolted to the plates 30, the latter having openings 30ª communicating with the interior of the mouth pieces.

As shown, the mouth pieces are spaced from the retorts and insulating material is interposed between the refractory mass and the mouth pieces; said mouth pieces are designed to be moved into alinement with and into coal carbonizing relation with the retorts when the apparatus is brought up to working temperature. In practice, I employ, in addition to the finely ground insulating material 35, refractory blocks 36, and temporary supporting means 37. This particular construction is shown in my pending application, Serial Number 866,185, filed October 12, 1914.

What I claim is:—

1. The herein described method which consists in assembling a refractory mass structure to localize expansion and in a non-carbonizing formation, and then bringing the structure to coal carbonizing formation by the expansion of the mass in bringing the retorts thereof to working temperatures.

2. The herein described method which consists in assembling a refractory mass structure to localize expansion and in a non-carbonizing formation, subjecting the mass structure to the action of heat to bring the structure to coal carbonizing formation by the expansion action of the mass in bringing the retorts thereof to working temperatures, such structure in operation providing a preponderance of retort heating by conduction.

3. The herein described method of constructing gas generating apparatus of the coal carbonizing retort type which consists in assembling the refractory mass structure with individual expanding and contracting portions, the expansion and contraction of such portions being as units.

4. The herein described method of constructing and heating gas generating apparatus of the coal carbonizing retort type which consists in assembling the refractory mass as individuals positioned successively lengthwise of the apparatus with the individuals relatively positioned to permit independent unitary expansion of the individuals in bringing the apparatus to working temperature.

5. The herein described method of constructing and heating gas generating apparatus of the coal carbonizing retort type which consists in assembling the refractory mass as individuals positioned successively lengthwise of the apparatus, and with the retorts of the individuals in non-carbonizing condition, and placing the retorts in carbonizing condition by the expansion action of the individuals in bringing the apparatus to working temperature.

6. The herein described method of constructing and heating gas generating apparatus of the coal carbonizing retort type which consists in assembling substantially similar refractory units in individual mass-structure formation, with the length of each individual on a line in the direction of length of a retort less than the working length of such retort, and with the retorts of the individuals in carbonizing condition, and producing the working length of the retorts and placing the retorts of individuals in carbonizing condition by the expansion action of the individuals in bringing the apparatus to working temperature.

7. The herein described method of constructing and heating gas generating apparatus of the coal carbonizing retort type which consists in assembling the refractory mass structure in a predetermined non-carbonizing formation at variance with the gas generating formation, inclosing the structure in a casing having a different co-efficient of expansion from that of the mass structure, and then bringing the mass and the casing to gas generating formation by the expansion action produced in bringing the retorts to working temperatures.

8. The herein described method of constructing and heating gas generating apparatus of the coal carbonizing retort type which consists in assembling substantially similar refractory units in the direction of length of the retorts to produce independent mass formations, inclosing the combined mass in a casing having a different co-efficient of expansion, the assembly relation of mass and casing being at variance with the gas-generating formation, and bringing the mass and casing into such latter formation by the expansion action in bringing the retorts to working temperatures.

9. The herein described method of constructing and heating gas generating apparatus of the coal carbonizing retort type which consists in assembling a refractory mass to localize expansion and in a con-carbonizing formation, inclosing the structure in a casing having a different co-efficient of expansion than the refractory mass, and then bringing the mass and the casing to gas generating formation by the expansion actions produced in bringing the retorts to working temperature.

In testimony whereof I affix my signature in presence of two witnesses.

HENRY A. CARPENTER.

Witnesses:
 ADA M. STEELE,
 M. J. STEELE.